United States Patent
Yang et al.

(10) Patent No.: US 8,620,096 B2
(45) Date of Patent: Dec. 31, 2013

(54) VIRTUALIZATION SERVER FOR PRESENTATION VIRTUALIZATION AND IMAGE DATA ENCODING METHOD

(75) Inventors: Dae-Gyu Yang, Daejeon (KR); Mun-Hee Kim, Seoul (KR)

(73) Assignee: KT Corporation, Seongnam (KR)

( * ) Notice: Subject to any disclaimer, the term of this patent is extended or adjusted under 35 U.S.C. 154(b) by 92 days.

(21) Appl. No.: 13/306,446

(22) Filed: Nov. 29, 2011

(65) Prior Publication Data
US 2012/0141039 A1 Jun. 7, 2012

(30) Foreign Application Priority Data
Nov. 29, 2010 (KR) .................. 10-2010-0119910

(51) Int. Cl.
*G06K 9/36* (2006.01)

(52) U.S. Cl.
USPC ..................... 382/232; 382/233; 382/244

(58) Field of Classification Search
USPC .......... 382/232, 233, 236, 243, 244; 345/173, 345/613, 581, 647, 1.3; 315/370; 348/E9.027; 709/203, 200; 707/999.1; 715/234, 238
See application file for complete search history.

(56) References Cited

U.S. PATENT DOCUMENTS

| | | | |
|---|---|---|---|
| 7,079,157 B2 * | 7/2006 | Deering | 345/613 |
| 7,594,168 B2 * | 9/2009 | Rempell | 715/234 |
| 8,015,232 B2 * | 9/2011 | Vigil et al. | 709/200 |

FOREIGN PATENT DOCUMENTS

KR 10-2004-0072612 A 8/2004

* cited by examiner

*Primary Examiner* — Anh Do
(74) *Attorney, Agent, or Firm* — Sughrue Mion, PLLC

(57) ABSTRACT

Provided are a virtualization server for presentation virtualization and a method thereof. The virtualization server includes: a virtual layer management unit which generates a virtual screen for a user terminal; a service operation unit which executes a service requested from the user terminal, and displays a result of the executed service on the virtual screen; a screen division processing unit which divides the virtual screen into a plurality of sub-blocks; and an image data encoding unit which classifies the plurality of sub-blocks into image sub-blocks and text sub-blocks and encodes the image sub-blocks by a first encoding scheme and encodes the text sub-blocks by a second encoding scheme.

20 Claims, 3 Drawing Sheets

VIRTUALIZATION SERVER FOR PRESENTATION VIRTUALIZATION AND IMAGE DATA ENCODING METHOD

CROSS-REFERENCE TO RELATED APPLICATION

This application claims priority from Korean Patent Application No. 10-2010-0119910, filed on Nov. 29, 2010 in the Korean Intellectual Property Office, the entire disclosures of which are incorporated herein by reference.

BACKGROUND

1. Field

Apparatuses and methods consistent with exemplary embodiments relate to providing presentation virtualization of cloud services and a server therefor, and more particularly, to maintaining minimum readability of text regions and reducing transmission to a terminal through a network, in the process in which a virtualization server renders and encodes an image of a service platform to provide presentation virtualization.

2. Description of Related Art

Users may be provided with services in various fields such as gaming, music and movies through network services. Users may also be provided with a virtual world similar to a real world based on virtual reality technology, real-time interaction technology, etc. Accordingly, high functional and high performance service terminals have been demanded, thereby accelerating developments in service terminals.

However, as developments in services have overtaken developments in service terminals, there may be a case where service terminals could not execute services. In order to solve this problem, cloud technology, which enables a platform to execute functions executed by a terminal and provide execution results to the terminal, is emerging.

Cloud computing is computing technology that logically consolidates scattered information technology (IT) sources, such as hardware, software, and data, through the Internet such that the sources are dynamically utilized as needed.

Presentation virtualization is one of core technologies for cloud computing. According to presentation virtualization, processes therefor are carried out at remotely from an input/output (I/O) terminal, such that a server activates an application program, and a user terminal controls the program.

In particular, according to presentation virtualization, a central server activates an application program, and a user terminal accesses the server to utilize the corresponding application program, irrespective of an operation system of the user terminal.

However, plural user terminals are connected to the central server to execute an application program, and continuously receive a result screen from the central server. As such, when network bandwidth is insufficient, the user terminals may not naturally display the result screen in real time. If network bandwidth is broadened to solve the problem, a large amount of costs for broadening the network bandwidth would be required.

Korean Patent Application Publication No. 10-2004-0072612 entitled "A Method for Compressing and Restoring Moving Image and Device Therefor" (hereinafter "Patent Document 1," the entire disclosure of which is incorporated herein by reference) relates to a method for compressing data of a moving image by dividing the moving image into a plurality of blocks, removing some pixels to compress a size of the blocks, and sequentially carrying out discrete cosine transformation (DCT), quantization, and entropy decoding for the compressed blocks, a method for restoring the blocks by sequentially carrying out entropy decoding, reverse quantization, and reverse DCT for the compressed data to restore the blocks, searching and first interpolating pixels in a position of an inclined line with pixel values within the blocks restored from the blocks prior to the compression, and subsequently, interpolating deleted pixels in the manner that pixels in the other positions are secondarily interpolated, and a method for reconstructing the restored square blocks to be original screen image data. However, in compressing a moving image, the related art does not classify divided blocks of a screen into images and texts and does not use different compression methods therefor. Accordingly, there is a problem because in case of a large amount of compression, readability of texts is deteriorated.

In order to solve the problem, technology, which encodes sub-blocks by classifying the sub-blocks into images and texts and using different encoding methods therefor, thereby reducing an amount of data to be transmitted and maintaining readability of texts, has been demanded.

SUMMARY

Aspects of one or more exemplary embodiments provide a method of realizing presentation virtualization without deteriorating readability of texts even when limited network bandwidth is used.

According to an aspect of an exemplary embodiment, there is provided a virtualization server for presentation virtualization, the virtualization server including: a virtual layer management unit which generates a virtual screen for a user terminal; a service operation unit which executes a service requested from the user terminal, and displays results of the executed service on the virtual screen; a screen division processing unit which divides the virtual screen into a plurality of sub-blocks; and an image data encoding unit which classifies the plurality of sub-blocks into image sub-blocks and text sub-blocks and encodes the image sub-blocks by a first encoding scheme and encoding the text sub-blocks by a second encoding scheme.

According to an aspect of another exemplary embodiment, there is provided an image data encoding method for presentation virtualization, the method including: acquiring information of a virtual screen to be transmitted to a user terminal; dividing the virtual screen into a plurality of sub-blocks; classifying each sub-block into one of an image sub-block and a text sub-block based on characteristics of the sub-block and encoding the image sub-block by a first encoding scheme and encoding the text sub-block by a second encoding scheme.

According to an aspect of another exemplary embodiment, limitation to network bandwidth is satisfactory, and readability of texts within an image can be maintained in the process of encoding image data to realize presentation virtualization.

According to the above-described aspects of exemplary embodiments, presentation virtualization can be realized by using a terminal within a network having narrow network bandwidth or a low performance terminal.

BRIEF DESCRIPTION OF THE DRAWINGS

Non-limiting and non-exhaustive exemplary embodiments will be described in conjunction with the accompanying drawings. Understanding that these drawings depict only several exemplary embodiments in accordance with the disclosure and are, therefore, not to be intended to limit its scope, the disclosure will be described with specificity and detail through use of the accompanying drawings, in which.

DETAILED DESCRIPTION OF EXEMPLARY EMBODIMENTS

Figure 1:
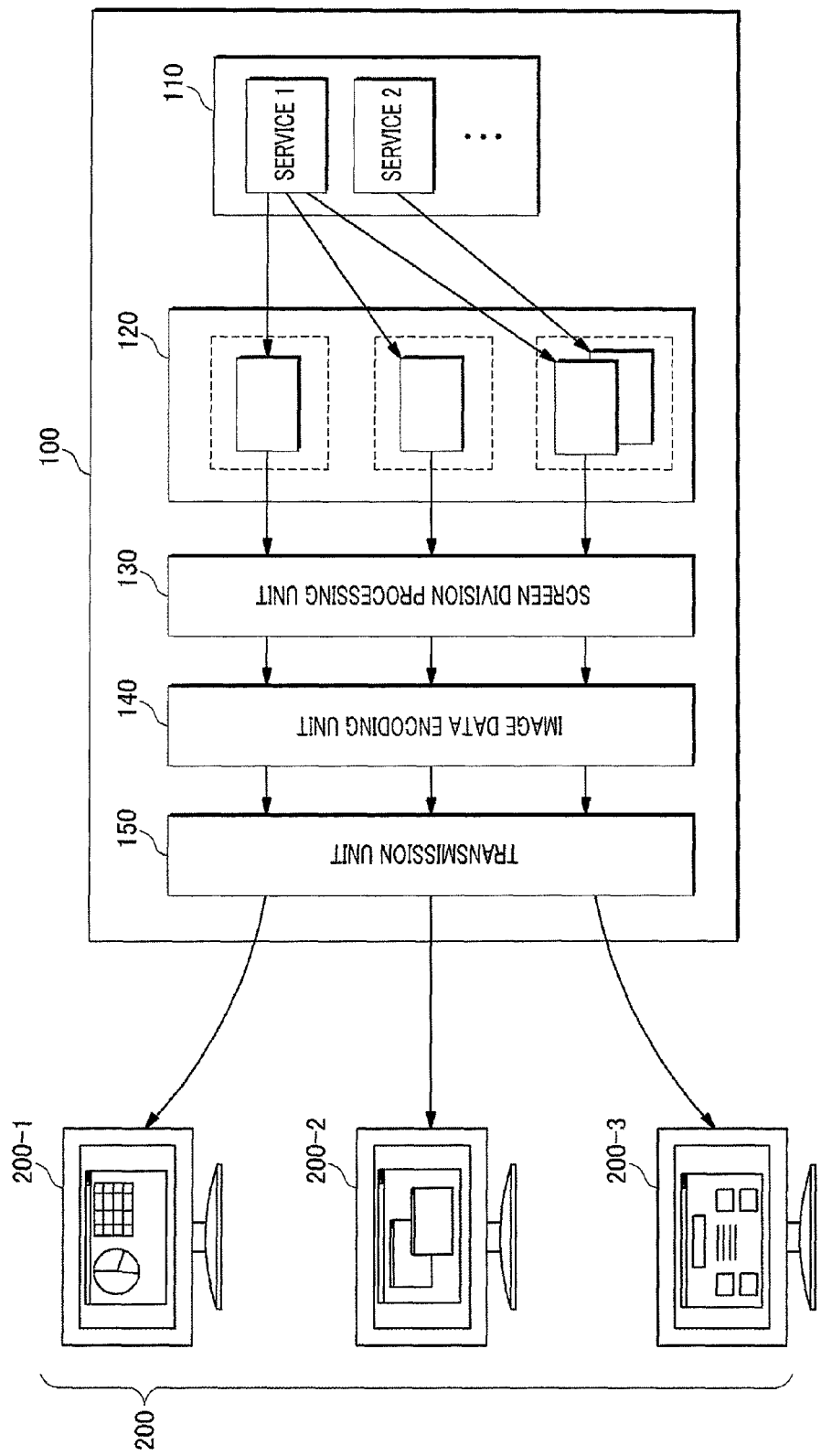
FIG. 1 is a detailed configuration view of a virtualization server for presentation virtualization, according to an exemplary embodiment.

Hereinafter, exemplary embodiments will be described in detail with reference to the accompanying drawings so that exemplary embodiments may be readily implemented by those skilled in the art. However, it is to be noted that the present inventive concept is not limited to the exemplary embodiments but can be realized in various other ways. In the drawings, parts irrelevant to the description are omitted for the simplicity of explanation, and like reference numerals denote like parts throughout the whole document.

Throughout the whole document, the term "connected to" or "coupled to" that is used to designate a connection or coupling of one element to another element includes both a case that an element is "directly connected or coupled to" another element and a case that an element is "electronically connected or coupled to" another element via still another element. Further, the term "comprises or includes" and/or "comprising or including" used in the document means that one or more other components, steps, operations and/or existence or addition of elements are not excluded in addition to the described components, steps, operations and/or elements. Moreover, hereinafter, expressions such as "at least one of," when preceding a list of elements, modify the entire list of elements and do not modify the individual elements of the list.

Hereinafter, exemplary embodiments will be explained in detail with reference to the accompanying drawings.

FIG. 1 is a detailed configuration view of a virtualization server 100 for presentation virtualization, according to an exemplary embodiment.

As illustrated in FIG. 1, a virtualization server 100 for presentation virtualization communicates with a plurality of user terminals 200 through a network. The virtualization server 100 receives service requests from the plurality of user terminals 200 to execute the requested services, and transmits a service execution result screen to the plurality of user terminals 200 to be displayed on screens of the plurality of user terminals 200.

The plurality of user terminals 200 request services, for example, execution of application programs and reproduction of multimedia files such as moving images and music, from the virtualization server 100, and receive an execution result screen for the requested services from the virtualization server 100 as an image (for example, in JPEG, BMP, or other formats) to output the image on the respective screens. For example, the user terminals 200 may be computers, mobile devices, mobile phones, portable multimedia players, notebook computers, tablets, smart devices, televisions, personal digital assistants, etc.

The virtualization server 100 receives service execution requests from the plurality of user terminals 200-1, 200-2, and 200-3 and executes the requested services. The virtualization server 100 constructs a virtual layer for each of the plurality of user terminals 200-1, 200-2, and 200-3, and transmits execution screens and execution result screens for the requested services to the plurality of user terminals 200-1, 200-2, and 200-3.

The virtualization server 100 includes a service operation unit 110, a virtual layer management unit 120, a screen division processing unit 130, an image data encoding unit 140, and a transmission unit 150.

The service operation unit 110 executes services requested from the plurality of user terminals 200, and displays execution results on the virtual screens. Specifically, the service operation unit 110 receives requests for execution of services, for example, execution of application programs, reproducing of multimedia files such as moving images and music, etc., from the plurality of user terminals 200, enables the virtualization server 100 in lieu of the plurality of user terminals 100 to execute the requested services, and provides screen outputs resulting from the execution process and execution results to the virtual layer management unit 120 as set forth below.

The virtual layer management unit 120 constructs a virtual screen for each of the plurality of user terminals 200. Specifically, the virtual layer management unit 120 constructs a virtual layer for each of the plurality of user terminals 200 connected to the virtualization server 100, and renders screen output information transmitted by the service operation unit 110. In the case of a plurality of services requested from the plurality of user terminals 200, the virtual layer management unit 120 receives screen information for a corresponding service from the service operation unit 110 and renders a screen to be displayed on one or more of the plurality of user terminals 200.

The screen division processing unit 130 divides a virtual screen corresponding to a user terminal 200 into a plurality of sub-blocks. Specifically, the screen division processing unit 130 divides a virtual screen that has been rendered to be provided to a user terminal 200 into sub-blocks in a fixed size. For example, the screen division processing unit 130 divides a whole screen into sub-blocks in at least one of a size of 16×16, 32×32, and 64×64. The divided sub-blocks are minimum units for transmission. If a part of the virtual screen is modified, the divided sub-blocks may be used for partial update.

Figure 3:
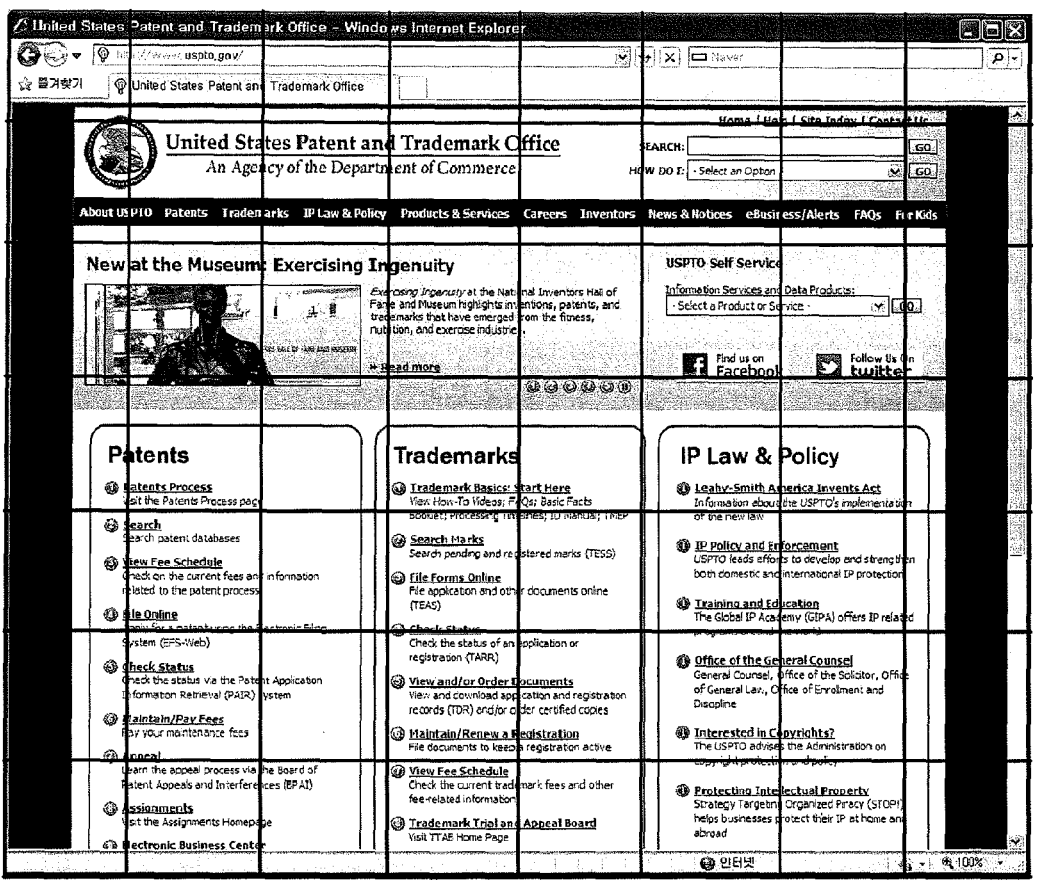
FIG. 3 shows division of a screen into sub-blocks, according to an exemplary embodiment.

FIG. 3 illustrates results of division of a screen into a plurality of sub-bocks, according to an exemplary embodiment. In particular, FIG. 3 shows results of division of a screen into 8×8 sub-blocks.

The image data encoding unit 140 encodes the divided sub-blocks by classifying the divided sub-blocks into images and texts and using different encoding methods therefor. If a screen of the user terminal 200 is virtualized and transmitted, the screen of the user terminal 200 may complexly display contents having various characteristics. In particular, such contents may be largely divided into image regions having various colors and high pixel variation and text regions having simple colors, i.e., black and white, and low pixel variation.

In the case of image regions, deterioration of image quality is not visually remarkable even when a lossy encoding method having a high compression rate such as JPEG and BMP is applied. However, in the case of text regions, when the lossy encoding method is applied, outlines of letters are severely squashed such that deterioration of image quality is visually remarkable, thereby affecting readability of the letters. Accordingly, the text regions are preferably encoded by using a lossless encoding method, rather than the lossy encoding method.

The image data encoding unit 140 receives information for the screen divided into sub-blocks, and determines whether each of the sub-blocks belongs to image regions or text regions. As one example for the determination, histogram properties of pixels may be analyzed.

In the case of image regions, since degree of pixel variation is high, pixel variation is continuous. However, since text regions are, for example, in black and white colors, the histogram of pixels is discrete in most cases. Accordingly, if pixels are continuously connected to one another, the image data encoding unit 140 classifies sub-blocks into image blocks. If pixels are discrete, the image data encoding unit 140 classifies sub-blocks into text blocks. If images and texts are mixed in a sub-block, the image data encoding unit 140 may divide the sub-block into image regions and text regions again, and then classifies the divided sub-blocks into image blocks and text blocks.

Thereafter, the image data encoding unit 140 encodes the image sub-blocks and the text sub-blocks that have been classified, by using different encoding methods therefor to provide the encoded sub-blocks to user terminals 200 through the transmission unit 150 as set forth below.

The transmission unit 150 transmits the sub-blocks encoded by the image data encoding unit 140 to the corresponding user terminals 200. The transmission unit 150 checks whether all the sub-blocks constructing one screen have been transmitted, and may search sub-blocks that have not yet been transmitted to retransmit the sub-blocks.

Also, in the case where the text sub-blocks have been subject to lossy encoding, the transmission unit 150 notifies the user terminals 200 that the text sub-blocks have been subject to lossy encoding, thereby enabling the user terminals 200 to carry out a follow-up process for increasing correction to letter outlines for the corresponding text sub-blocks.

Hereinafter, an image data encoding method for presentation virtualization according to an exemplary embodiment will be described.

Figure 2:
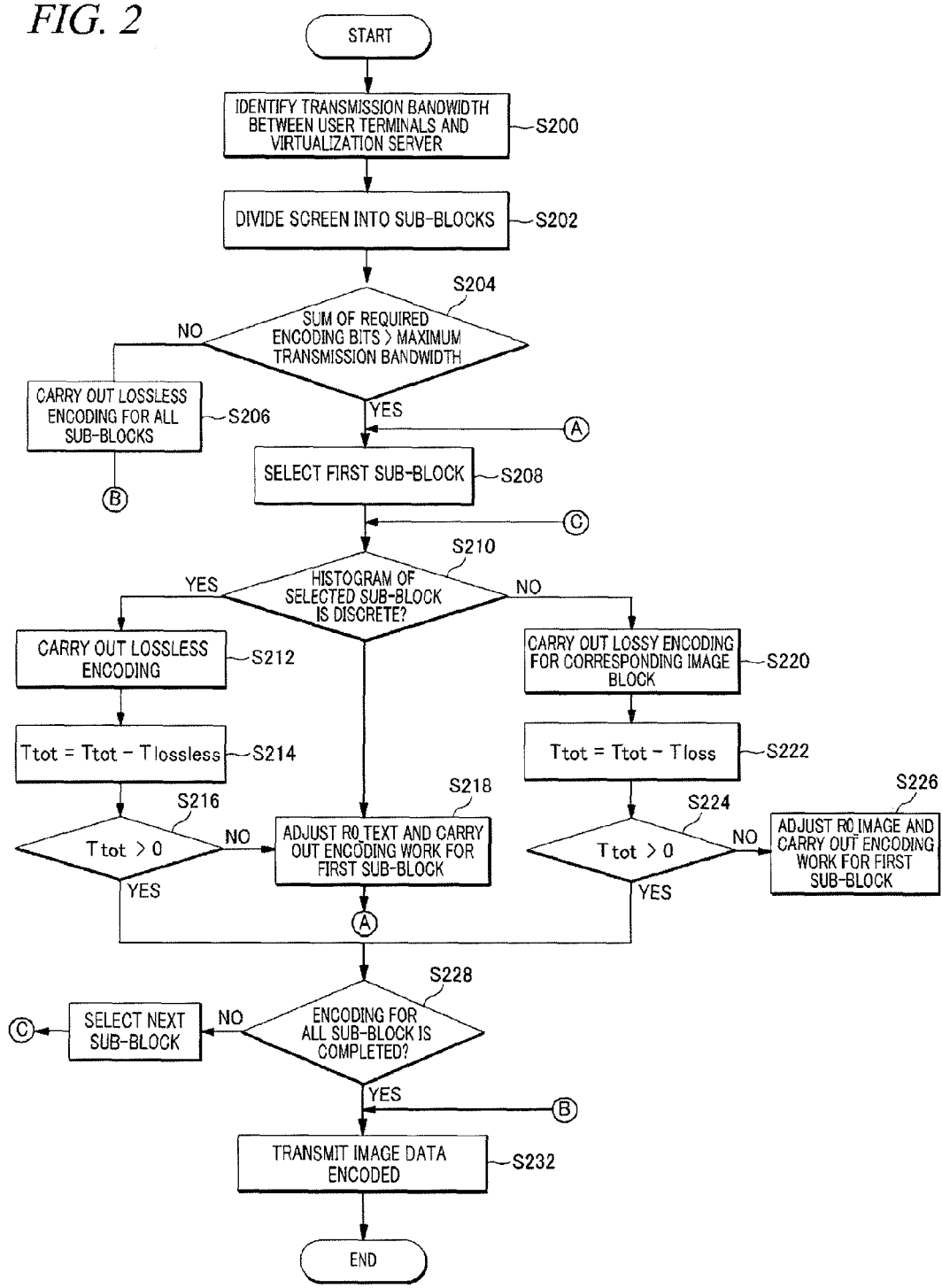
FIG. 2 is a flowchart to explain an image data encoding method, according to an exemplary embodiment.

FIG. 2 is a flowchart to explain an image data encoding method, according to an exemplary embodiment. As illustrated in FIG. 2, a virtualization server 100 identifies maximum transmission bandwidth between one or more user terminals 200 and the virtualization server 100 (operation S200). The maximum transmission bandwidth may be determined based on a minimum amount of data used to provide presentation virtualization to a user terminal 200 and display information on the screen of the user terminal 200. If data transmission to the user terminal 200 exceeds the maximum transmission bandwidth, an encoding bit rate is readjusted such that an amount of data after image data encoding is compressed to become smaller.

Thereafter, the virtualization server 100 divides the screen into a plurality of sub-blocks, and classifies the divided sub-blocks into image sub-blocks and text sub-blocks (operation S202).

Thereafter, if the whole screen is subject to lossless encoding, the virtualization server 100 compares a sum of required encoding bits and the maximum transmission bandwidth to the user terminal 200 (operation S204). If the sum of required encoding bits is smaller than the maximum transmission bandwidth, the virtualization server 100 may carry out the lossless encoding for all the sub-blocks (operation S206). The virtualization server 100 transmits image data encoded after the lossless encoding for all the sub-blocks to the user terminal 200 (operation S232).

If the sum of the encoding bits is larger than the maximum transmission bandwidth, the virtualization server 100 may carry out lossy encoding for the image blocks. In this case, for example, an initial lossy encoding bit rate for the image blocks is R0_image. The virtualization server 100 selects the first sub-block (operation S208), and analyzes a histogram of the selected sub-block. If the histogram is discrete, the corresponding sub-block is treated as a text block. If the histogram is continuous, the corresponding sub-block is treated as an image block (operation S210).

For the text block, the virtualization server 100 carries out lossless encoding at first (operation S212). In this case, for example, an initial lossless encoding bit rate for the text block is R0_text. This value may be 100% (i.e., lossless) at first.

The virtualization server 100 carries out lossless encoding for the selected sub-block by using R0_text, and subtracts the encoding bit (Tlossless) of the corresponding block from the maximum transmission bandwidth (Ttot) (operation S214). If a value obtained from subtracting the encoding bit (Tlossless) of the corresponding block is less than 0, i.e., if the encoding bit (Tlossless) of the corresponding block exceeds the maximum transmission bandwidth, the virtualization server 100 adjusts R0_text to change the lossless encoding into lossy encoding, and carries out the encoding for the first sub-block and the following sub-blocks by using the changed R0_text (operation S218). The virtualization server 100 repeatedly carries out the encoding for all the sub-blocks (operation S228).

For the image block, the virtualization server 100 carries out lossy encoding for the corresponding image block by using the initial lossy encoding bit rate R0_image (operation S220). Thereafter, the virtualization serer 100 subtracts an encoding bit (Tloss) of the corresponding block from the maximum transmission bandwidth (Ttot) (operation S222). If a value obtained from subtracting the encoding bit (Tloss) of the corresponding block is less than 0, i.e., if the encoding bit (Tloss) of the corresponding block exceeds the maximum transmission bandwidth, the virtualization server 100 adjusts R0_image, and carries out the encoding again for the first sub-block and the following sub-blocks by using the adjusted R0_image (operation S226). The virtualization server 100 repeatedly carries out the encoding for all the sub-blocks (operation S228).

Once the encoding for all the sub-blocks is carried out, the virtualization server 100 transmits the encoded image data, for which the encoding has been carried out, to the user terminal 200 (operation S232).

According to the image data encoding method described above, an amount of information used for encoding is reduced, and readability of text regions may be remarkably improved.

While the above-described exemplary embodiments relate to an image data encoding method for a virtualization server, it is understood that one or more other exemplary embodiments are not limited thereto and may be applied for any image data encoding outside the context of presentation virtualization. Moreover, while the above-described exemplary embodiments relate to an encoding method, it is understood that one or more other exemplary embodiments provide a decoding method for decoding image blocks and text blocks using different decoding schemes.

Exemplary embodiments may be embodied in a storage medium including instruction codes executable by a computer such as a program module executed by the computer. Moreover, a data structure in accordance with an exemplary embodiment may be stored in a storage medium executable by the computer. A computer readable medium can be any usable medium which can be accessed by the computer and includes any volatile and non-volatile media and any removable and non-removable media. Further, the computer readable medium may include any computer storage and communication media. The computer storage medium includes any volatile and non-volatile media and any removable and non-removable media embodied by a certain method or technology for storing information such as computer readable instruction code, a data structure, a program module or other data. The communication medium may include the computer readable instruction code, the data structure, the program module, or other data of a modulated data signal such as a carrier wave, or other transmission mechanism, and includes a certain information transmission medium. Moreover, one or more units of the above-described devices and servers can include a processor or microprocessor executing a computer program stored in a computer-readable medium.

The above description is provided for the purpose of illustration, and it is understood by those skilled in the art that various changes and modifications may be made without departing from the present inventive concept. Thus, it is clear that the above-described exemplary embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of exemplary embodiments. It shall be understood that all modifications and exemplary embodiments conceived from the meaning and scope of the claims and their equivalents are included in the scope of the present disclosure.

What is claimed is:

1. A virtualization server for presentation virtualization, the server comprising:
    a virtual layer management unit which generates a virtual screen for a user terminal;
    a service operation unit which executes a service requested from the user terminal, and which displays a result of the executed service on the generated virtual screen;
    a screen division processing unit which divides the virtual screen into a plurality of sub-blocks; and
    an image data encoding unit which classifies a sub-block, of the plurality of sub-blocks, into one of an image sub-block and a text sub-block and which encodes image sub-blocks by a first encoding scheme and encodes text sub-blocks by a second encoding scheme.

2. The virtualization server of claim 1, further comprising:
    a transmission unit which transmits the classified sub-block to the user terminal.

3. The virtualization server of claim 1, wherein the first encoding scheme is a lossy encoding scheme and the second encoding scheme is a lossless encoding scheme.

4. The virtualization server of claim 1, wherein the image data encoding unit classifies the sub-block into the one of the image sub-block and the text sub-block based on histogram properties of pixels of the sub-block.

5. The virtualization server of claim 2, wherein when the sub-block is the text sub-block and encoded according to a lossy encoding scheme, the transmission unit notifies the user terminal that the sub-block is lossy encoded, to instruct the user terminal to carry out a post-process for correcting character outlines for the text sub-block.

6. The virtualization server of claim 5, wherein when the sub-block is the text sub-block and a number of encoding bits of the plurality of sub-blocks exceeds a maximum transmission bandwidth for transmission to the user terminal, the image data encoding unit encodes the sub-block by a lossy encoding scheme.

7. The virtualization server of claim 1, wherein the first encoding scheme is a lossy encoding, if an amount of data for lossless encoding the plurality of sub-blocks exceeds a maximum transmission bandwidth for transmission to the user terminal.

8. The virtualization server of claim 1, wherein the first encoding scheme and the second encoding scheme are lossless encoding schemes, if the amount of data for lossless encoding the plurality of sub-blocks does not exceed the predetermined amount of data.

9. An image data encoding method for presentation virtualization, the method comprising:
    acquiring information of a virtual screen to be transmitted to a user terminal;
    at a server, dividing the virtual screen into a plurality of sub-blocks;
    classifying a sub-block, of the plurality of sub-blocks, into one of an image sub-block and a text sub-block; and
    encoding the image sub-block by a first encoding scheme and encoding the text sub-block by a second encoding scheme.

10. The image encoding method of claim 9, further comprising:
    transmitting the encoded sub-block to the user terminal.

11. The image data encoding method of claim 9, wherein the first encoding scheme is a lossy encoding, if an amount of data for lossless encoding the plurality of sub-blocks exceeds a predetermined amount of data.

12. The image encoding method of claim 11, wherein the encoding the text sub-block comprises performing lossy encoding of the text sub-block, if the predetermined amount of data minus an amount of data for lossy encoding of all image sub-blocks of the plurality of sub-blocks is less than an amount of data for lossless encoding of all text sub-blocks of the plurality of sub-blocks.

13. The image encoding method of claim 12, wherein the encoding the text sub-block further comprises performing lossless encoding of the text sub-block, if the predetermined amount of data minus the amount of data for lossy encoding of all image sub-blocks of the plurality of sub-blocks is not less than the amount of data for lossless encoding of all text sub-blocks of the plurality of sub-blocks.

14. The image encoding method of claim 11, wherein the first encoding scheme and the second encoding scheme are lossless encoding schemes, if the amount of data for lossless encoding the plurality of sub-blocks does not exceed the predetermined amount of data.

15. The image encoding method of claim 11, wherein the predetermined amount of data is a maximum transmission bandwidth between a virtualization server and the user terminal.

16. A computer readable recording medium having recorded thereon a program executable by a computer for performing the method of claim 9.

17. An image data encoding method, the method comprising:
    at a server, dividing an image into a plurality of sub-blocks;
    classifying a sub-block, of the plurality of sub-blocks, into one of an image sub-block and a text sub-block; and
    encoding the sub-block by a first encoding scheme if the sub-block is classified as the image sub-block and encoding the sub-block by a second encoding scheme if the sub-block is classified as the text sub-block.

18. A computer readable recording medium having recorded thereon a program executable by a computer for performing the method of claim 17.

19. An image data decoding method for presentation virtualization, the method comprising:

at a server, receiving, from a virtualization server for presentation virtualization, encoded image data of a virtual screen;

determining whether a sub-block, of the received image data, is an image sub-block or a text sub-block; and decoding the sub-block by a first decoding scheme when the sub-block is determined as the image sub-block and decoding sub-block by a second decoding scheme when the sub-block is determined as the text sub-block.

20. A computer readable recording medium having recorded thereon a program executable by a computer for performing the method of claim 19.

* * * * *